(12) United States Patent
Chaky

(10) Patent No.: US 10,697,159 B2
(45) Date of Patent: Jun. 30, 2020

(54) WATER TEMPERATURE CONTROL SYSTEM AND METHOD

(71) Applicant: Rebecca Carol Chaky, Saint Louis, MO (US)

(72) Inventor: Rebecca Carol Chaky, Saint Louis, MO (US)

(*) Notice: Subject to any disclaimer, the term of this patent is extended or adjusted under 35 U.S.C. 154(b) by 225 days.

(21) Appl. No.: 15/567,401

(22) PCT Filed: Apr. 14, 2016

(86) PCT No.: PCT/US2016/027418
§ 371 (c)(1),
(2) Date: Oct. 18, 2017

(87) PCT Pub. No.: WO2016/171979
PCT Pub. Date: Oct. 27, 2016

(65) Prior Publication Data
US 2018/0094413 A1 Apr. 5, 2018

Related U.S. Application Data

(60) Provisional application No. 62/149,635, filed on Apr. 19, 2015.

(51) Int. Cl.
E03C 1/05 (2006.01)
G05D 23/13 (2006.01)
E03C 1/04 (2006.01)
G05B 15/02 (2006.01)
G05D 7/06 (2006.01)
E03B 1/04 (2006.01)
E03C 1/044 (2006.01)
E03B 7/04 (2006.01)

(52) U.S. Cl.
CPC ............ *E03C 1/055* (2013.01); *E03C 1/0408* (2013.01); *G05B 15/02* (2013.01); *G05D 7/0635* (2013.01); *G05D 23/1393* (2013.01); *E03B 1/048* (2013.01); *E03B 7/045* (2013.01); *E03C 1/041* (2013.01); *E03C 1/044* (2013.01)

(58) Field of Classification Search
CPC ........ E03B 1/048; E03B 7/045; E03C 1/0408; E03C 1/041; E03C 1/044; E03C 1/055; G05B 15/02; G05D 23/1393; G05D 7/0635
See application file for complete search history.

(56) References Cited

U.S. PATENT DOCUMENTS 4,756,030 A * 7/1988 Juliver .................... E03C 1/055
137/334
5,428,850 A * 7/1995 Hiraishi .................... E03C 1/05
4/601

(Continued)

OTHER PUBLICATIONS

Vicki Hafenstein, "Kohler DTV+ Digital Showering System Turns Bathrooms into Destinations", Press release Jan. 20, 2015, Kohler, Wisconsin.

*Primary Examiner* — Henry T Crenshaw
(74) *Attorney, Agent, or Firm* — Fordinand M. Romano; Accel IP Law

(57) ABSTRACT

A programmable system with user interface control for water flow rate or water temperature. Embodiments of the invention include a water temperature control system for a shower.

20 Claims, 12 Drawing Sheets

(56) References Cited

U.S. PATENT DOCUMENTS

| | | | | |
|---|---|---|---|---|
| 8,843,239 B2* | 9/2014 | Mighdoll | ............ | G05D 23/1902 |
| | | | | 700/277 |
| 2006/0069453 A1* | 3/2006 | DeBourke | ............... | E03C 1/041 |
| | | | | 700/19 |
| 2008/0259056 A1* | 10/2008 | Freier | ................ | G05D 23/1393 |
| | | | | 345/184 |
| 2010/0078491 A1* | 4/2010 | Aoyagi | .............. | G05D 23/1393 |
| | | | | 236/12.14 |
| 2011/0186138 A1* | 8/2011 | Hanna | ....................... | E03C 1/05 |
| | | | | 137/1 |
| 2015/0322652 A1* | 11/2015 | Mazz | ..................... | E03C 1/055 |
| | | | | 137/560 |
| 2016/0208467 A1* | 7/2016 | Song | ....................... | E03C 1/057 |
| 2016/0208947 A1* | 7/2016 | Song | ....................... | F16K 31/02 |

\* cited by examiner

WATER TEMPERATURE CONTROL SYSTEM AND METHOD

PRIORITY BASED ON RELATED APPLICATION

This application is a 371 US National Stage entry of PCT Application PCT/US16/27418, filed Apr. 14, 2016. PCT/US16/27418 claims priority to provisional patent application Ser. No. 62/149,635 filed 19 Apr. 2015. Both applications are hereby incorporated in their entirety.

FIELD OF THE INVENTION

This invention relates to control of water usage and, more particularly, to automated systems and methods for controlling flows of water such as, for example, user selection of customized settings to dispense flows of water.

BACKGROUND OF THE INVENTION

The conventional process of opening a hot water valve and running a water stream to "warm up the water" generally means sending water that is too cold down the waste drain, e.g., because water in a hot water line has cooled-down in the hot-water pipe (i.e., between the water heater and the point of use). This wasted resource, previously heated potable water, is normally purged from the system with no benefit received.

Users often find that manual control of water temperature and output flow rate in showers and sinks can be difficult to operate with consistency. This can create an unsatisfactory or annoying situation when attempting to achieve a desired setting and maintain that setting. For example, small valve adjustments may result in large temperature and flow rate responses, with resultant waste of water, time, and thermal energy. Achieving a successful temperature adjustment on one day is no guarantee against experiencing a different outcome on another occasion. That is, adjusting to the same setting may suddenly result in scalding water or freezing cold water, creating a moment of distraction, inconvenience or discomfort on another day. Another issue which arises in shower systems is that when there is a sudden pressure drop (e.g., due to flushing of a toilet), there may be an abrupt loss of water pressure in a cold water supply line, which may dramatically shift the mix of hot/cold water and even cause a user to experience scalding hot shower water.

SUMMARY OF THE INVENTION

In a first series of embodiments the invention provides a showering system which includes a controller for use with a shower head which receives water according to first or second configurations of the system. The first configuration provides a first operating mode which enables manual control for mixing hot and cold water when showering. The second configuration provides a user selectable second operating mode in which a user can program system settings with the controller to execute a timed sequence of automated showering steps. The second operating mode automatically blends hot and cold water during a plurality of the showering steps to send water through the shower head at a predefined temperature specified by the user.

Disclosed embodiments of the showering system include a feed line providing hot water, a feed line providing cold water, and first and second branch lines each coupled to the feed lines to send hot and cold water through the shower head. At least one manual control valve is positioned in the first branch line to control flow of water through the shower head when the system is operated in the first mode. First and second normally open valves are positioned in the first branch line and configured by the controller to prevent flow of water through the first branch line to the shower head when the system is operated in the second mode. A plurality of additional automated valves, including first and second normally closed valves positioned in a second branch line, control flow of water through the second branch line to the shower head. The plurality of additional automated valves is configured to automatically control mixing of hot and cold water when the system is operating in the second mode.

The controller may adjust one or more in the plurality of additional automated valves to achieve a selected temperature for mixing of hot and cold water. The system may operate in the first configuration as a default condition and otherwise operate in the second configuration, e.g., when a user selects operation in the second mode. The controller may be a microcomputer which, in the second configuration, runs a program to automatically provide the user selectable timed sequence of automated steps. The system may also include a processor based handheld device having a wireless communication link with the controller. The handheld device may execute application software by which a user can program controller settings and initiate the timed sequence of automated showering steps in the second mode of operation.

The showering system may also including a powered flow control valve positioned to receive flow from the second branch line to control flow of water to the shower head when the system operates in the second mode. The controller may adjust the powered flow control valve responsive to a user selected flow of water through the shower head.

In a second series of embodiments a computer-implemented method automatically controls operation of a showering system in a user selectable program mode. The showering system method includes executing a first series of program steps to provide a user selected timed sequence of showering steps by automatically blending a mixture of hot and cold water and sending the mixture through a water line to a shower head. The method also includes receiving digital data into a microcomputer to select a programmed sequence of timed steps for a showering activity, specifying, for at least one of the steps, a desired temperature for water flowing through the shower head, and providing to the microcomputer sensor information indicative of temperatures in hot and cold feed lines to the shower head. For at least one step in the selected sequence, the microcomputer system sends signals that blend hot and cold water by adjusting one or more valve positions to attain the desired temperature for water flowing through the shower head.

In illustrated embodiments of the computer-implemented method, the water flows through the shower head at the desired temperature for a predetermined time, and the method further includes operating the microcomputer system to then change the temperature of water flowing through the shower head in accord with another step in the selected sequence. This can be accomplished by further adjusting the one or more valve positions to provide water through the shower head at a user specified temperature.

Prior to sending signals that blend hot and cold water, the computer-implemented method may purge water in the hot water feed line, e.g., when water temperature in the hot water feed line is below a threshold value. The method of blending hot and cold water to attain the desired temperature may involve feedback control based on temperature measurement of water flowing to the shower head. The method may also provide communication between the microcomputer and a handheld programmable device including application software the execution of which is a second series of program steps that provide (i) the digital data based on the user selected timed sequence of showering steps or (ii) the desired temperature for water flowing through the shower head.

Also according to embodiments of the computer-implemented method, communication may occur between the microcomputer and a handheld programmable device over a network with a wireless communication link. The microcomputer may select valve settings to effect flow of water from the hot and cold feed lines through either of first and second branch lines to send hot and cold water through the shower head. In this embodiment, the first branch line may provide manual control for mixing hot and cold water when showering, with the second branch line having one or more valves under control of the microcomputer for adjusting a valve position to attain the desired temperature for water flowing through the shower head.

In a third series of embodiments the invention provides an automated method for controlling operation of a shower according to a user preference. According to the method, a sequence of timed steps is selected for a showering activity with each step specifying a desired temperature of water flowing through a shower head. Electrical signals are provided to a control system. The signals are indicative of temperatures in hot and cold feed lines connected to the shower head. Electrical signals indicative of temperature of water flowing through the shower head are also provided to the control system. For at least one step in the selected sequence, the control system sends signals that blend hot and cold water from the feed lines by adjusting one or more valves to attain a temperature for water flowing through the shower head in accord with that specified for the at least one step. Water flows through the shower head at the specified temperature for a predetermined time, then the control system sends signals that change the temperature of water flowing through the shower head in accord with another step in the sequence. This is accomplished by further adjusting the one or more valves to provide water through the shower head at the temperature specified for said another step.

In example embodiments of the automated method water may be purged from a portion of the hot feed line prior to initiating one of the timed steps, and the one or more valves may be adjusted using feedback control to attain the temperature specified for water flowing through the shower head for the at least one step. In another embodiment the control system sends signals that adjust the flow rate of water passing through the shower head in accord with a value specified for the at least one step. The control system may receive measured flow rate data from a water line and use feedback control to adjust the flow rate of water passing through the shower head.

In a third series of embodiments the invention provides a user controlled monitoring and control system for operating a shower in a plumbing system. The system includes a series of sensors providing temperature and flow rate information for water provided by hot and cold water feed lines which feed a shower head. Remotely controllable valves are positioned to adjust mixing of hot and cold water or flow rate of the water delivered from the hot and cold water feed lines. The monitoring and control system includes a processor and storage containing program instructions representing software executable on the processor. The instructions include a plurality of shower programs. Each shower program includes a sequence of showering steps. Each step is characterized by a specified time duration, a specified temperature, and a specified volume flow rate for water egressing from the shower head. The system also includes volatile memory to which the processor can write program instructions and data acquired from the sensors, and a user interface for selecting program options and displaying system information. The system is connectable through a network to monitor temperature and flow rate information provided by the sensors and to receive user selection of a shower program where, for one or more of the shower steps in the selected program, the system is responsive to user specified selections of (i) time duration of the step, and (ii) flow rate or temperature of water output from the shower head. The system automatically progresses through the steps of the user selected shower program sequence by sending control signals to adjust setting of one or more of the valves based on specifications in each shower step and information provided by the sensors.

In a fourth series of embodiments the invention provides a programmable system for a user to control flow or temperature of water being output by a plumbing system, including a bath or shower. A processing system is coupled to receive sensed values of water flow or water temperature for operation of the system in accord with specifications selected by the user. The processing system includes control signal output terminals to effect required adjustments to comply with a user selected temperature specification or a user selected flow rate specification for water output by the plumbing system. The system includes a plurality of sensors positioned to sense water temperature or flow rate in one or more water lines feeding an output from the bath or shower and to sense temperature in a temperature adjustable water line coupled to receive a controllable mixture of water from the hot and cold water lines. Each sensor is coupled to provide temperature or flow information to the processing system. A plurality of control lines extend from a processor to the plumbing system, and are coupled to control operation of one or more components in the plumbing system. The processing system is configured to modify mixing of water from the hot or cold water lines feeding the output and thereby adjust temperature of water in the temperature adjustable water line based in part on sensed water temperature information.

In a fifth series of embodiments the invention provides a water usage monitoring system, in a network interfacing a community of users, for a plurality of water usage control systems in the community. The system provides programmable water flow sequences in plumbing systems. The monitoring system includes user account registration capability, device-to-user account pairing capability, a library of programmed water flow sequences, software update capability, user interface capability and a processor. The system also includes a non-transitory computer readable medium containing program instructions representing software executable on the processor. The instructions, when executed by the processor, cause the system to perform method steps, including storing and organizing user preferences and modifications to the programmable sequences; storing, organizing, aggregating and reporting water and energy usage data; transferring data; performing analyses to determine energy consumption and water consumption; gathering baseline data; and providing alternate water flow sequences that reduce water and energy consumption for implementation by the water usage control systems.

BRIEF DESCRIPTION OF THE FIGURES

Other aspects and advantages of the present invention will be more clearly understood by those skilled in the art when the following description is read with reference to the accompanying drawings wherein.

Like reference numbers are used throughout the figures to denote like components. Numerous components are illustrated schematically, it being understood that various details, connections and components of an apparent nature are not shown in order to emphasize feature of the invention. Various features shown in the figures are not shown to scale in order to emphasize features of the invention.

DETAILED DESCRIPTION OF THE INVENTION

Before describing in detail particular methods, components and features relating to the invention, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention. The following embodiments are not intended to define limits as to the structure or method of the invention, but only to provide exemplary constructions. The embodiments are permissive rather than mandatory and are illustrative rather than exhaustive.

A programmable system is described for controlling the flow rate or temperature of water output from hot and cold water lines to a shower, tub, sink, pool, or ornamental pond. Embodiments of the invention include a water temperature control system (TC System) 12 for commercial or personal use. Illustrated embodiments of the TC System 12 are also water usage control systems. The system 12 provides a user with a programmable temperature and time control sequence, e.g., for showering with a timed sequence of water temperatures and flow rates. Programming and operation of the system, including water temperature control, may be effected through a remote user interface, e.g., a mobile device application ("app") or application software, an internet-enabled ("smart") appliance hub, or a browser. The programmable temperature control sequence may be pre-programmed and is programmable by the user in advance of or at the time of use. The system 12 may also learn personal preferences and modify the program sequence accordingly.

The illustrated control sequence of water temperatures and flow rates includes a water purge operation, a reheat operation or a reuse operation to remove cool water from a hot-water line (i.e., a supply pipe) so that only water meeting predefined temperature criteria is delivered for use. Water and energy usage data may be stored in the system 12 or uploaded to a remote server for aggregation with similar use data by others in an on-line community, e.g., as part of a water usage monitoring (WUM) system. This enables assessment of water and energy conservation resulting from use of the system.

Figure 1:
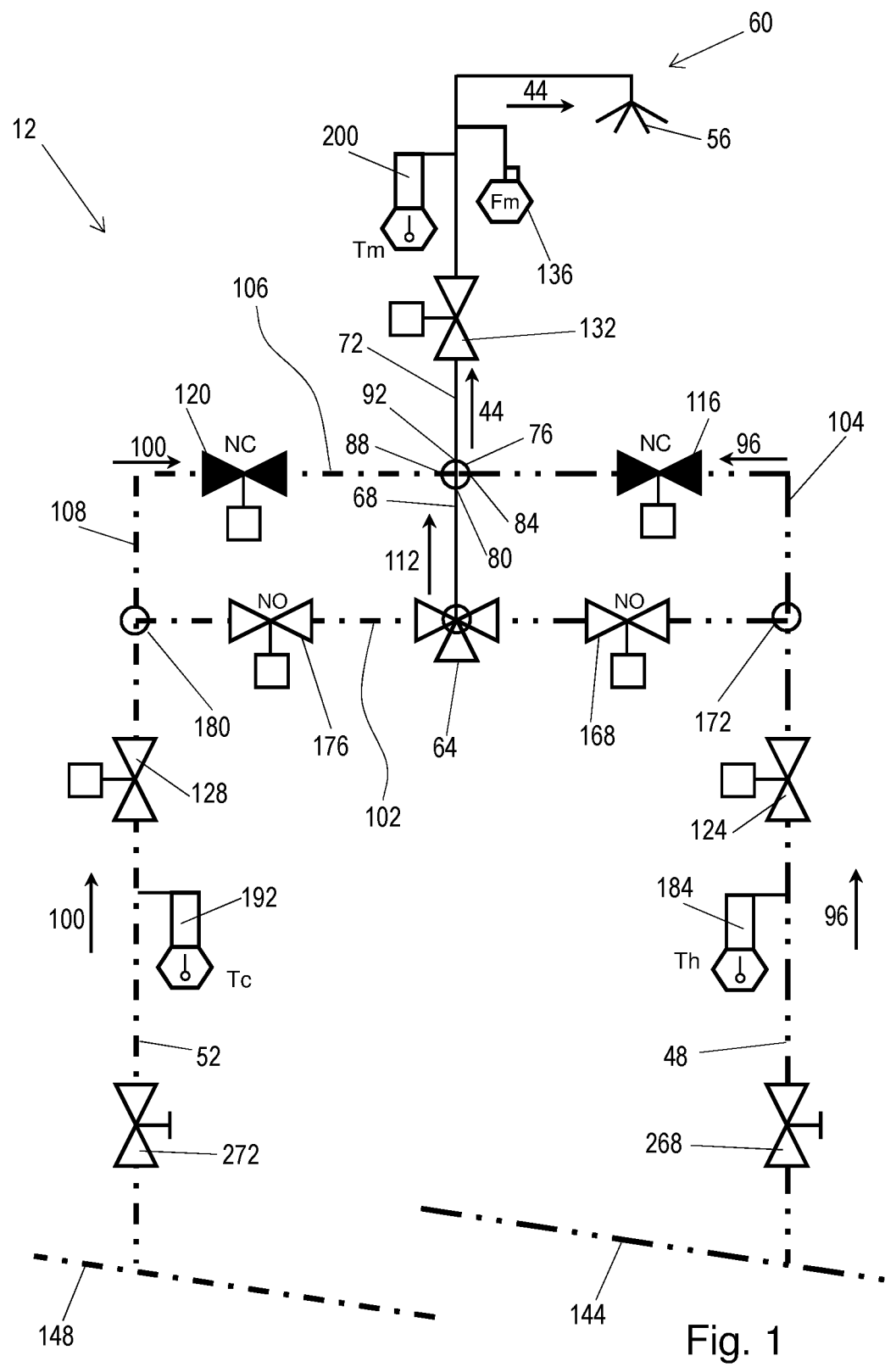
FIG. 1 illustrates, schematically, a shower embodiment of a water temperature control system according to the invention.

With reference to FIG. 1, an embodiment of the water temperature control system 12 includes a remote user interface 16 configured to reduce waste of cooled water during the process of delivering heated water for use. An improved shower experience is provided by eliminating manual adjustments and fiddling with controls to find a desired water temperature or flow rate setting. The system improves temperature and flow rate control, reduces time spent in the shower, reduces water usage, and reduces energy consumption by reducing hot water usage. The system 12 can provide an improved showering experience, e.g. for elderly and disabled persons, by reducing the physical effort required to adjust settings. Instead, a control device, e.g., a controller or a remote, hand-held unit performs adjustments. The device which performs the adjustments may be responsive to voice control commands to program the sequence of water temperatures and flow rates to further improve the ability of users to control the system, particularly by persons who are handicapped or who have reduced mobility. Embodiments of the invention may provide diagnostics for water heater or shower hardware with functions such as alerting the user when a water heater provides a water temperature above or below a predefined range, or alerting the user when there is restricted flow in the cold water supply, the hot water supply, or the shower head. Other features of the invention may include an ability to compute and report actual savings of water, time, energy, and green house gases; convert water, time and energy savings to monetary units; make such data available to individual users; and report aggregate cost savings data acquired from multiple users to members in a community participating in online monitoring.

The disclosed water-conserving systems and methods may provide more reliable temperature and flow delivery than has been available. The TC System 12 is programmable to facilitate ease of access and customization. This capability is particularly advantageous to assist elderly and disabled persons. Generally, the TC System 12 enables a user to select, modify, and initiate a sequence 20 of programmed water temperatures and flow rates. In one series of embodiments a learning application adjusts a programmed sequence of timed temperature and flow rate settings to suit personal preferences. Embodiments of the system are suited for commercial use, use in public venues (e.g., fitness facilities) and hotels and home use. The systems 12 may be provided by retrofitting existing plumbing systems or by installation of new systems in new construction. Summarily, embodiments of the invention provide enhanced temperature and flow control of water, with resultant water and energy conservation.

The term "control device" refers to an electronics unit including but not limited to one of a wall mounted base station, hand-held smart mobile device 240, tablet computer, laptop computer 332, personal computer 336, game controller, joystick, or other device with which the TC System 12 may be operated.

The terms "network interface" and "internet interface" refer to an internet connection or other network connection including but not limited to a wired connection, a wi-fi connection, or other device interface, through which the water TC System 12 may be directed. A cell phone application which interfaces with the system 12 may provide convenient access to the user which appears instantaneous, while layers of complexity necessary to support the service remain transparent. The type of internet interface is not limiting of the scope of the present invention.

The term "temperature mixing valve" or "mixing valve" refers to a three-way valve for receiving water inputs from both a hot water supply and a cold water supply and providing a blended temperature water output. The mixing valve may be manually or automatically controlled.

The term "mixed-temperature water" refers to water for which temperature could be adjusted by varying the proportions of water derived from hot and cold supply lines. In accord with several embodiments of the invention, mixed-temperature water 44 of temperature Tm is the output result of mixing the input cold water 100 and the input hot water 96.

The term "plumbing system" refers to any water-control systems including showers, tubs, sinks, pools, or ornamental ponds. Plumbing systems generally include a hot water supply line 144 (including hot line manual shutoff valve 268) delivering hot water 96, a cold water supply line 148 (including cold line manual shutoff valve 272) delivering cold water 100, and a means for mixing hot water 96 and cold water 100 such as, for example, a manual mixing valve 64. Plumbing systems may include a water delivery device such as a shower, tub, sink, pool, or ornamental pond.

Figure 5A:
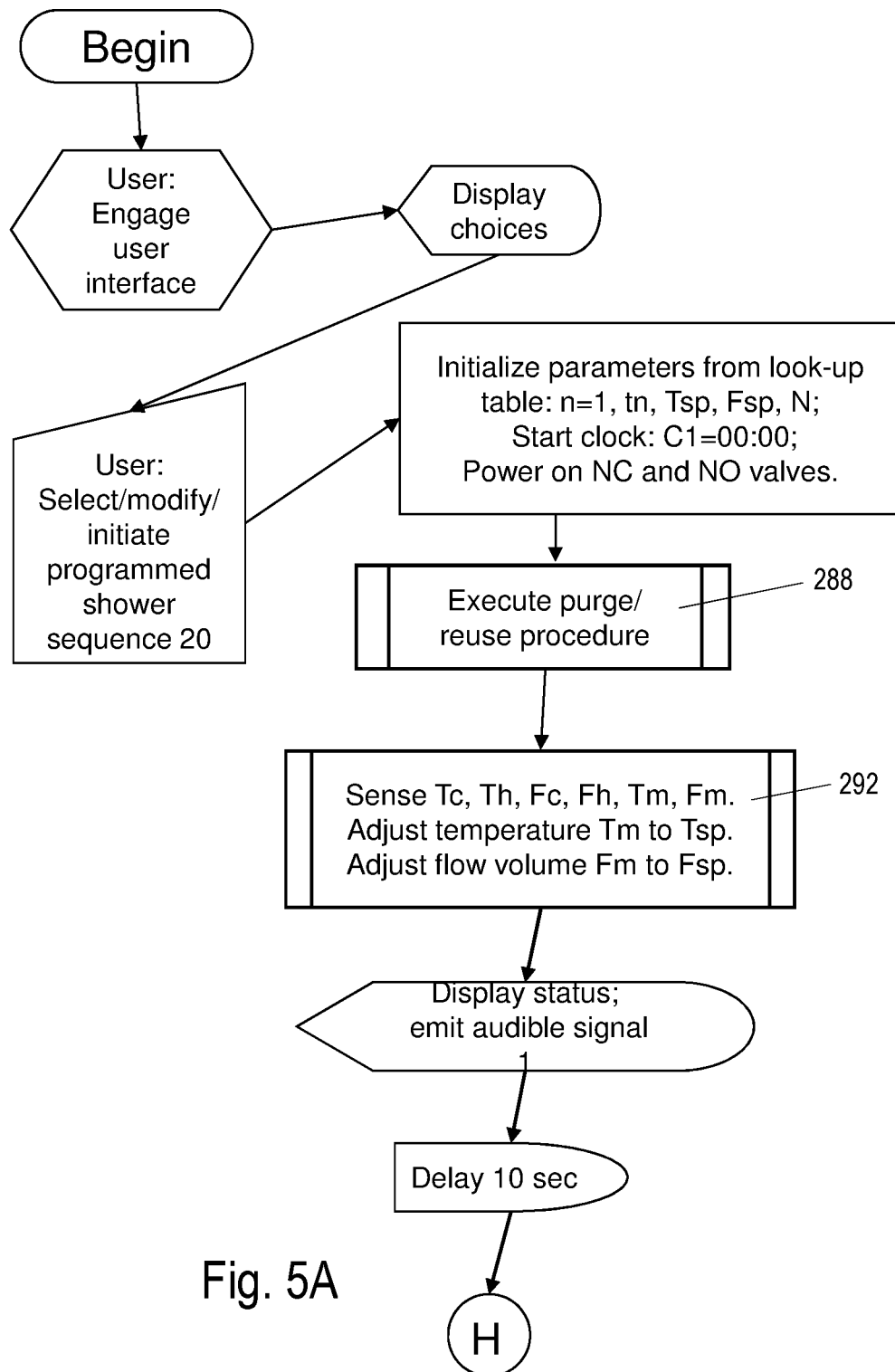
FIGS. 5A and 5B illustrate a programmed shower sequence in flowchart format.

For the algorithm illustrated in FIG. 5 and Table 2 below, input water flow rates are given as a percentage of flow rates which occur when input valves 128 and 124 of FIG. 1 are fully open. When the powered valve 128 is fully open, the input cold water flow rate Fc is 100; and when the powered valve 124 fully open, the input hot water flow rate Fh is 100. With this convention, the mixed water flow rate Fm may be compared to the sum of the input hot water flow rate Fh and the input cold water flow rate Fc, ignoring any time lag in water flow. Adding Fc and Fh, the mixed temperature water flow rate Fm in this convention ranges from 0 to about 200. A fairly high desired water flow rate, e.g. a flow rate set point Fsp, of 150 in FIG. 5 is therefore reasonable and within expected range.

The term "set point" refers to a desired value at the point of water delivery, e.g. the shower head. The exemplary temperature control sequence lookup chart in Table 2 (table described below with FIG. 5) specifies a mixed-temperature water temperature set point Tsp (e.g. 105° F., 41° C.) and a mixed-temperature water flow rate set point Fsp (e.g. 150).

In the alternative, Fc, Fh, Fm, and Fsp may be stated in units such as gallons or liters per minute. This facilitates aggregation of water usage data in a water usage monitoring (WUM) system 244.

The water temperature control (TC) system 12 comprises an internet interface 36 (not shown), a controller 32, one or more programmable temperature control sequences 20, a programmable thermostatic control algorithm, and an assembly of sensors, valves, controls, and meters in a plumbing system. The controller 32 interfaces with the sensors, valves, controls and meters to control valve operations, and monitors sensor and meter outputs and other parameters in conjunction with performing system processes. The illustrated controller 32 is a microcomputer containing a processor, storage and memory. As illustrated in FIG. 1, the TC system 12 may be implemented in new construction or a retrofit of a conventional plumbing system consisting of a shower 60 having a hot water supply line 48 and a cold water supply line 52 which feed a shower head 56 through a manual mixing valve 64. The manual mixing valve 64 is positioned in a first branch line 102 between a normally open (NO) hot supply control valve 168 and a normally open (NO) cold supply control valve 176. The first branch line extends between the hot water supply line 48 and the cold water supply line 52 to receive hot and cold water via a hot supply T fitting 172 and a cold supply T fitting 180. The TC system 12 includes a second branch line which also extends between the hot water supply line 48 and the cold water supply line 52 to receive hot and cold water via a hot supply T fitting 172 and a cold supply T fitting 180. A 4-way fitting 76 is positioned in the second branch line between a normally closed (NC) hot water control valve 116 and a normally closed (NC) cold water control valve 120. The first and second branch lines are arranged in parallel between the T fittings 172, 180. Based on valve settings in the branch lines, the TC system either sends water to the shower head 56 through the first branch line 102 or through the second branch line 106. In either case, water flows through the 4-way fitting 76 to reach the shower head 56.

The exemplary TC System 12 of FIG. 1 includes two water line segments in series that receive mixed-temperature water 44. The first segment, referred to as the Manually Controlled (MC) mixed water line segment 68, is connected to provide as the sole output to the shower head 56 a mixture of hot and cold water from the first branch line 102, only under the manual control of mixing valve 64, e.g., when the TC system 12 is in a default power-off mode. The second water line segment, referred to as the Programmably Controlled (PC) mixed water line segment 72, is connected to receive either (i) a mixture of hot and cold water only under the control of the manual mixing valve via the first water line segment 68, or (ii) a mixture of hot and cold water from the second branch line 106 solely under the control of the TC System 12, which operates control valves causing water flow to bypass the manual mixing valve 64.

Control valves 168, 176 are powered closed when the shower TC System 12 is in use. The PC mixed water line segment 72 and the MC mixed water line segment 68 are connected in series to carry mixed-temperature water 44 to the shower head from the manual mixing valve 64 when the TC System 12 is not in active use, i.e., not powered. With the addition of the exemplary TC System 12, 4-way fitting 76 is connected to receive water from three input ports 80, 84, and 88, and to provide water through one output port 92. The arrangement enables the PC mixed water line segment 72 to receive water from two inputs downstream of the manual mixing valve: hot water 96 from a hot water line segment 104 (described below) and cold water 100 from a cold water line segment 108 (described below).

The MC mixed water line segment 68 feeds water 112 output from the manual mixing valve 64 into the PC mixed water line segment 72 via a first input port 80 to the 4-way fitting 76. The hot water line segment 104 is connected to receive hot water from the supply line 48 through a hot supply T fitting 172, and is connected to a powered hot water control valve 116 (described below) to send the hot water 96 to the PC mixed water line segment 72 via a second input port 84 to the 4-way fitting 76. This bypasses the manual mixing valve 64 to provide hot water 96 from the hot water line segment 104 directly to the PC mixed water line segment 72. The cold water line segment 108 is connected to receive cold water from the supply line 52 through a cold supply T fitting 180, and is connected to a powered cold water control valve 120 (described below) to send the cold water 100 to the PC mixed water line segment 72 via a third input port 88 to the 4-way fitting 76. This bypasses the manual mixing valve 64 to provide cold water 100 from the cold water line segment 108 directly to the PC mixed water line segment 72. Thus, the TC System 12 provides a mixture of hot and cold water to exit the output port 92 of the 4-way fitting 76 for delivery to the shower head 56. With this configuration the TC System 12 hot water line segment 104 and cold water line segment 108 bypass the manual mixing valve 64 to operate the TC System 12 independently from operation of the manual mixing valve 64.

The hot water line segment 104 and the cold water line segment 108 include in-line normally closed (NC) powered valves 116 and 120 respectively, which valves are in a closed position when the TC System 12 is unpowered and inactive. The NC powered valves 116, 120 are adjustable only to (i) a fully closed position when the TC System 12 is unpowered and not operating, or (ii) a fully open position when the TC System 12 is powered and operating. A powered flow control valve 132 between the 4-way fitting 76 and the shower head 56 provides control of mixed-temperature water 44 to the shower head 56.

A powered normally open (NO) hot water valve 124 positioned in the hot water supply line 48 controls the input hot water flow rate Fh of hot water 96 fed through the second water input port 84 through the 4-way fitting 76 to the shower head 56. A powered NO cold water valve 128 positioned in the shower cold supply line 52 controls the input cold water flow rate Fc of cold water 100 fed through third water input 88 through the 4-way fitting 76 to the shower head 56. Simultaneous control, alternate control or individual control of the powered hot water control valve 124 and the powered cold water control valve 128 provide mixing adjustment capability to control temperature of water flow to the shower head 56 and, within limits set by the powered flow control valve 132, the flow rate Fm, of water flow to the shower head 56.

With reference to the embodiment of FIG. 1, a feature of the TC System 12 is inclusion of a pair of normally open (NO) control valves to disable the manual mixing valve when the TC System is in use. One NO control valve 168 is placed between the hot supply T fitting 172 and the manual mixing valve 64, and one NO control valve 176 is placed between the cold supply T fitting 180 and the manual mixing valve 64. Flow from the hot water supply line 48 and cold water supply line 52 into the manual mixing valve 64 is cut off by powering the NO control valves 168, 176 into closed positions. When the TC System 12 is not powered for use, the two NO control valves 168, 176 are in the open positions. When the TC System 12 is powered for use, the two NO control valves 168, 176 are in the closed positions to prevent egress of water from the manual mixing valve 64 into the MC mixed water line segment 68 and toward the shower head 56.

A hot water line temperature sensor 184 is positioned in the hot water supply line 48 to measure a hot water temperature Th. A cold water line temperature sensor 192 is positioned in the cold water supply line 52 to measure a cold water temperature Tc. A mixed water temperature sensor 200 positioned in the PC mixed water line segment 72 measures the temperature, Tm, of mixed water dispensed through the point of water delivery which, in this example, is a shower head 56. A flowmeter 136, positioned in the PC mixed water line segment 72, measures the flow rate, Fm, of mixed-temperature water 44 passing through the shower head 56. In the embodiment of FIG. 1, a powered flow control valve 132 is positioned in the PC mixed water line segment 72 downstream of the 4-way fitting 76 to modify the flow rate Fm of water 44 dispensed through the shower head 56 based on measured flow rate Fm and user selection of flow rate, i.e., with a selectable flow rate set point Fsp.

Referring to FIG. 5, the programmable temperature control sequence 20 of timed steps may include a purge operation 288 to remove cooled-down water 216 from the hot-water supply line 48 by sending the water through the shower head 56 and down the drain (not shown). To limit water loss, the purge operation 288 is shortened by the TC System 12 by monitoring the temperature Tm and signaling (e.g., audibly or with LED display lights) when the mixed temperature water 44 is at the predefined setpoint temperature Tsp. An automatic control may stop the purge operation 288 when a set point temperature Tsp is reached.

Figure 2A:
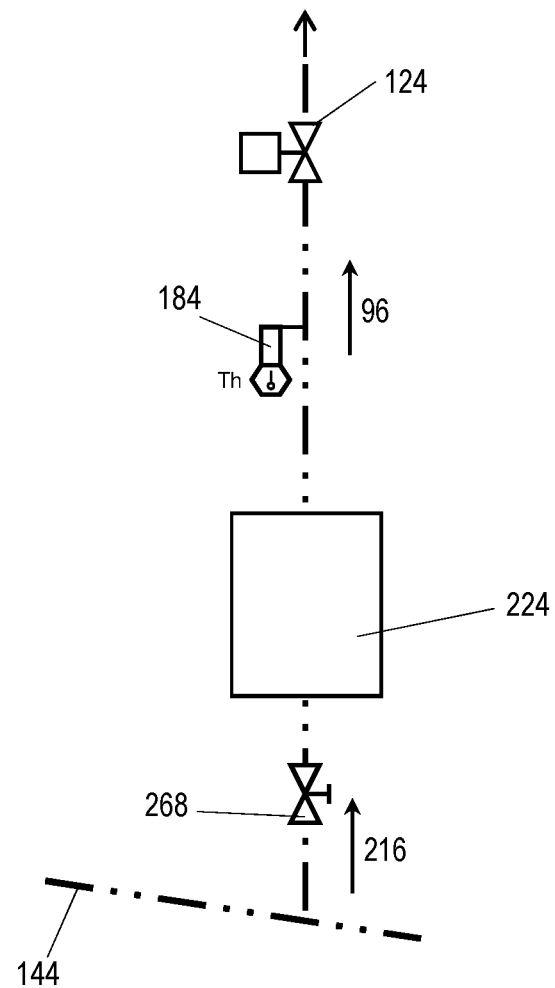
FIG. 2A illustrates an alternate embodiment of the water temperature control system comprising a tankless or flash heater.
Figure 2B:
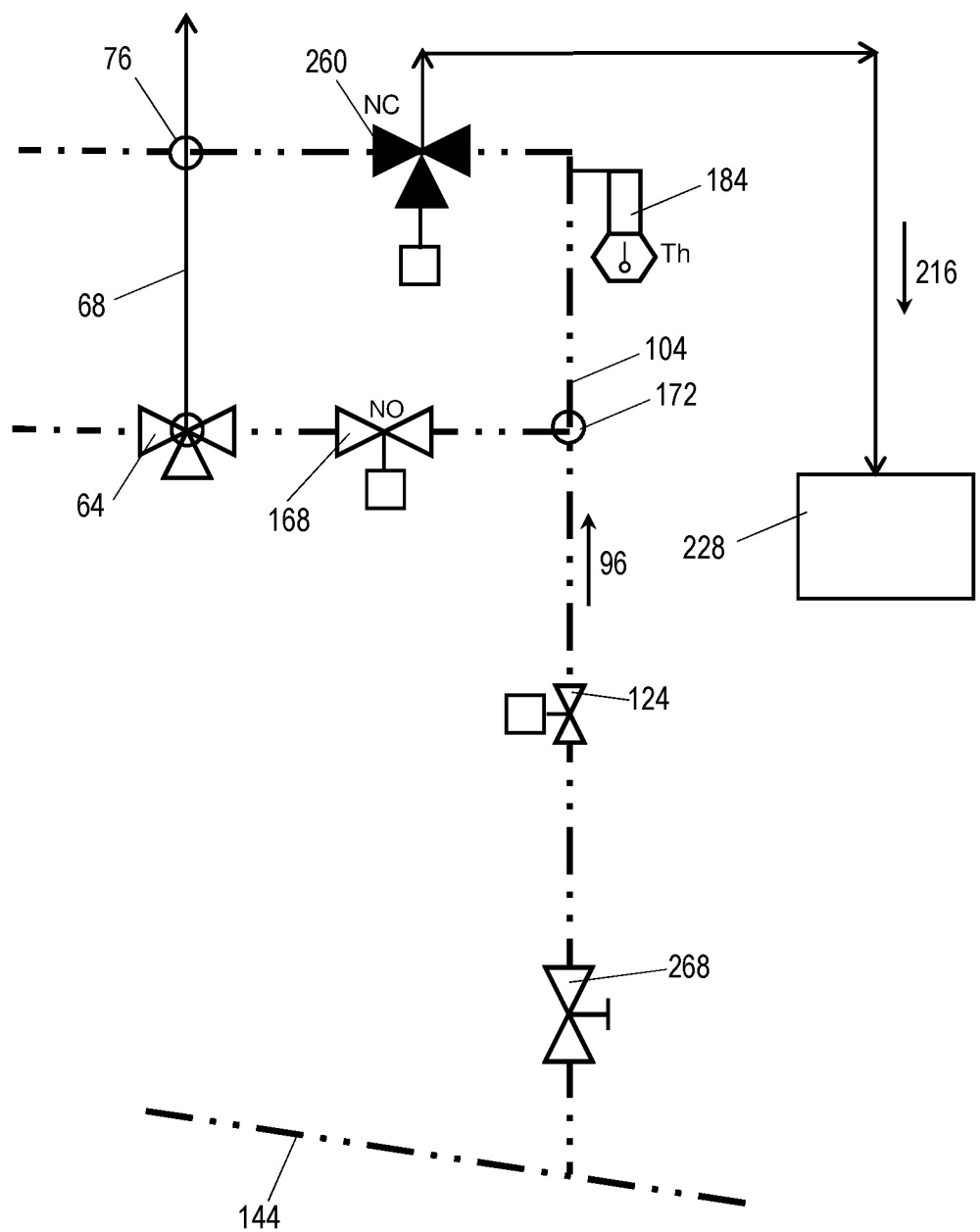
FIG. 2B illustrates another embodiment of the water temperature control system which redirects cooled water from a hot water supply line.
Figure 2C:
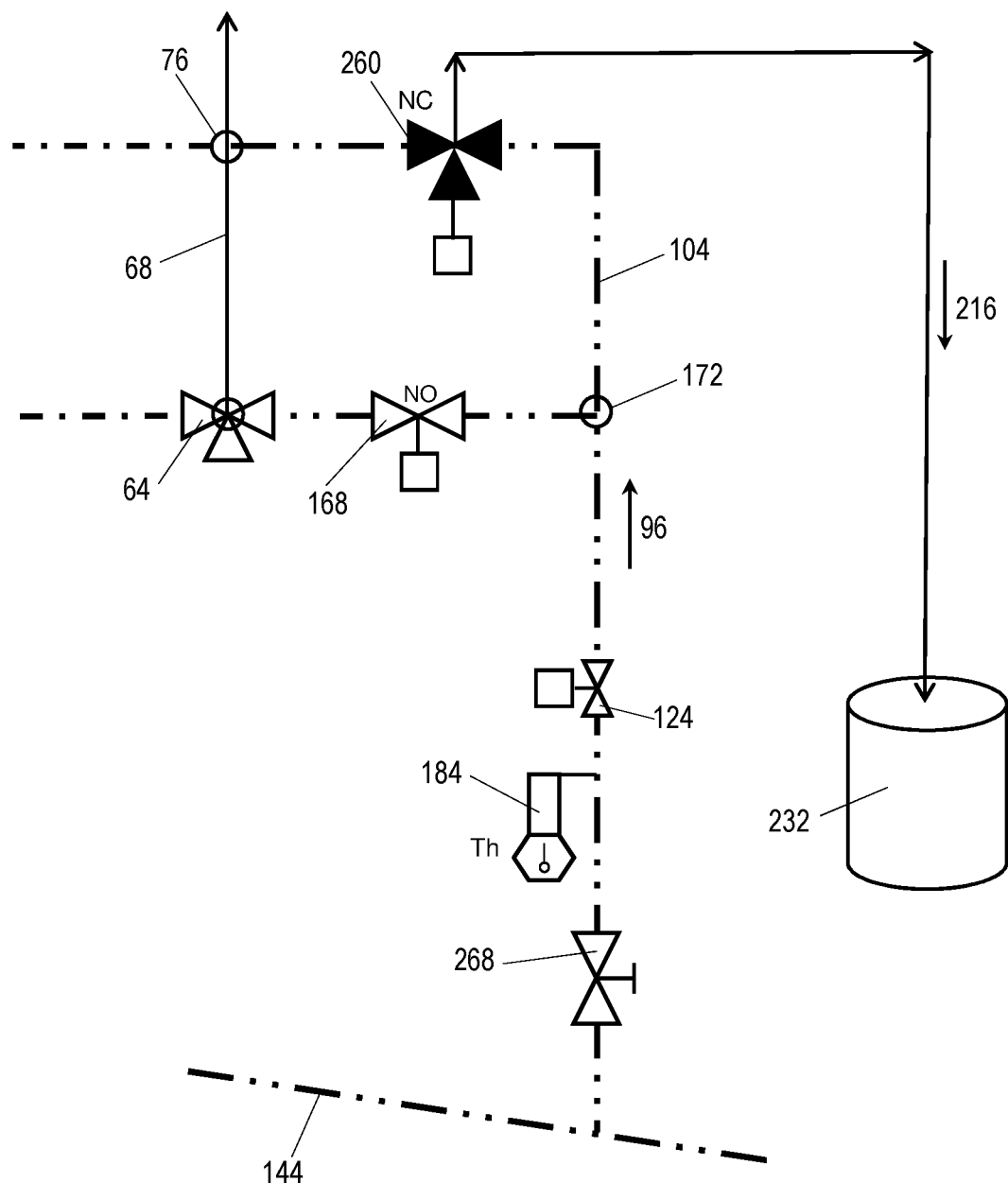
FIG. 2C illustrates still another embodiment of the water temperature control system which provides for recycling of cooled water from a hot water supply line.

In other embodiments the programmable temperature control sequence may include a re-use option that removes cooled-down water 216 from the hot-water supply pipe 48 to assure that only water within a predefined range is delivered for use. With reference to FIGS. 2A, 2B, and 2C, embodiments are illustrated which capture, divert, or use the cooled water 216 obtained from the hot water supply pipe 48. FIG. 2A illustrates a tankless or flash heater 224 which separately heats the cooled water 216 for further use as part of the hot water supply 48. In the embodiment of FIG. 2B a powered hot water control and diverter valve 260 is used to send the cooled water 216 to a home reservoir or holding tank 228, e.g., for re-use as a cold water supply or for flushing a toilet. In the embodiment of FIG. 2C a powered hot water control and diverter valve 260 is used to send the cooled water 216 to a home or commercial water heater 232 for reheating and further use as a hot water supply. These re-use options reduce the waste of potable water which would otherwise be sent down the drain with no benefit received.

The water temperature control may be operated with a wall mounted base station (not shown), hard-wired, or wirelessly connected to the controller 32, or through any of a number of remote interfaces such as a mobile device 240 app, or through an internet browser on a personal computer 336 or other device. The programmable temperature control sequences 20 may be used as pre-programmed by a vendor or a user, or these may be adjusted online or at the time of use or with a learning capability by which the program sequence learns personal preferences. An embodiment includes use of the powered flow control valves 124, 128 to provide an automated water flow rate control which may include a shower massage flow rate and other flow control settings. Table 1 illustrates an exemplary set of shower sequences 20 in the shower program, each comprising a sequence of N steps.

TABLE 1

An exemplary set of shower sequences 20

| Step | Temperature | Flow rate | Time td (min) | Notes |
|---|---|---|---|---|
| Program Sequence 20-1, N = 7 | | | | |
| 1 | Medium | Medium | 1 | Wash face |
| 2 | Cool | Medium | 2 | Shampoo hair |

TABLE 1-continued

An exemplary set of shower sequences 20

| Step | Temperature | Flow rate | Time td (min) | Notes |
|---|---|---|---|---|
| 3 | Cool | Low | 1 | Condition hair ends |
| 4 | Medium | Low | 2 | Soap up |
| 5 | Medium | Medium | 2 | Rinse off |
| 6 | Hot | High | 1 | Shoulder massage |
| 7 | Cool | Medium | 1 | Rinse hair |
| | | | 10 | Total minutes |
| Program Sequence 20-2, N = 4 | | | | |
| 1 | Medium | Medium | 1 | Wash face |
| 2 | Medium | Low | 2 | Soap up |
| 3 | Medium | Low | 5 | Shave |
| 4 | Medium | Medium | 2 | Rinse off |
| | | | 10 | Total minutes |
| Program Sequence 20-3, N = 7 | | | | |
| 1 | Medium | Medium | 1 | Wash face |
| 2 | Cool | Medium | 2 | Shampoo hair |
| 3 | Medium | Low | 1 | Condition hair ends |
| 4 | Medium | Low | 3 | Soap up |
| 5 | Medium | Medium | 2 | Rinse off |
| 6 | Hot | High | 2 | Shoulder massage |
| 7 | Cool | Medium | 1 | Rinse hair |
| | | | 12 | Total minutes |
| Program Sequence 20-4, N = 1 | | | | |
| 1 | Hot | High | 3 | Soap up, rinse off |
| | | | 3 | Total minutes |

Exemplary values for cool, medium, and hot temperatures are 80° F. (27° C.), 105° F. (41° C.), and 120° F. (49° C.), respectively. Exemplary values for low, medium, and high flow rates are 50, 100, and 150 respectively, using the convention described in the description of FIG. 1 of valves 124, 128. These exemplary values are used in the description of FIG. 5 below.

Figure 3:
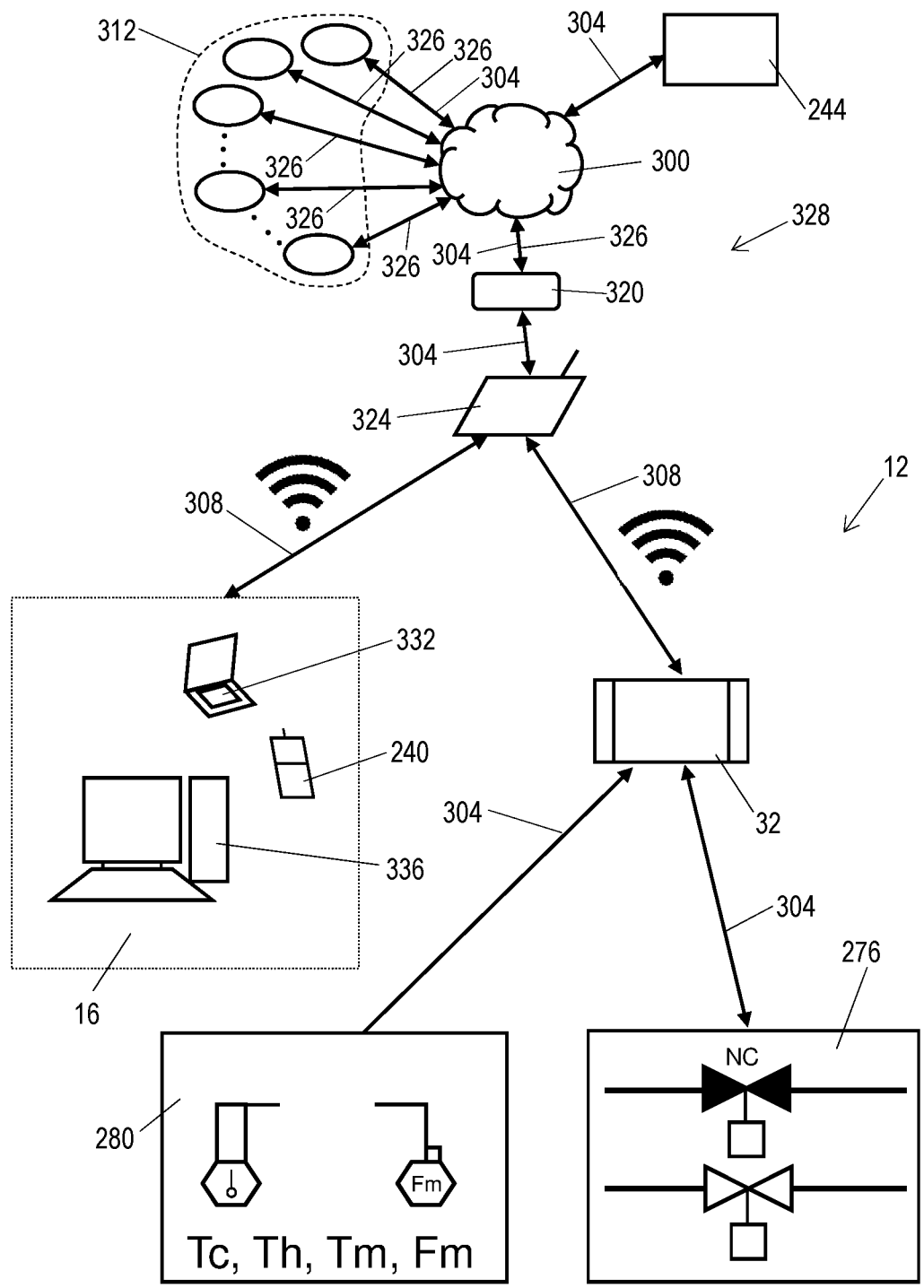
FIG. 3 illustrates a user interface of the water temperature control system and an associated water usage monitoring system.

Water and energy usage data may be saved or uploaded to a remote server for aggregation with similar use data for an online community, as part of a water usage monitoring (WUM) system 244. This enables assessment of water and energy conservation success. The WUM 244 system may monitor usage of a plurality of water flow or temperature control devices on a network using one or more computers. FIG. 3 illustrates a WUM system 244 connected to an exemplary programmable TC System 12 as well as a plurality of additional TC systems 12 in an online community 312. The exemplary programmable TC System 12 is shown comprising sensors 280, actuators 276, a user interface 16 and a controller 32. Infrastructure for data transmission comprises a cable or wireless data link 304, a wireless data link 308, a router/modem 324, an internet service provider (ISP) 320, and the internet 300, over which communication of data 326 occurs for assimilation and reporting by the WUM system 244. The wireless data link 308 may use Blue Tooth or other wireless technology. The TC system 12 controller 32 may be a programmable logic controller either hard-wired or with a wireless communication connection. One or more programmed sequences 20 may run on the controller 32 rather than on a WUM 244 via the internet 300 to avoid internet service 328 communication rate variability and connectivity problems which can occur with variations in network traffic and signal strength.

Figure 4:
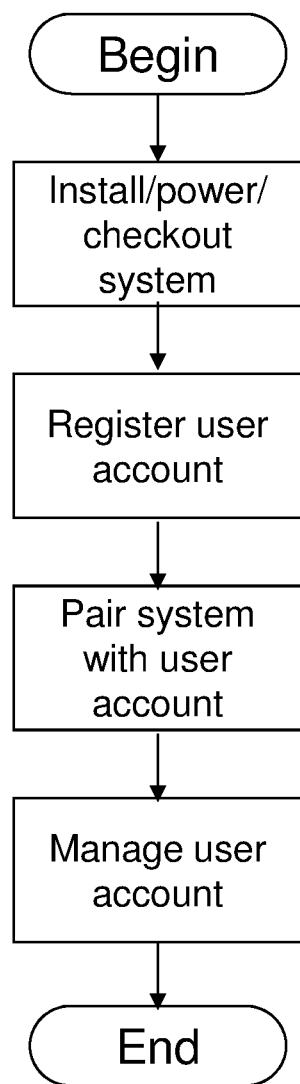
FIG. 4 illustrates a sequence of steps associated with account initialization in the water usage monitoring system.

The WUM system 244 may include capabilities typically associated with an online community, including user account registration, device-to-user account pairing, software updates, and a user interface 16. The WUM system 244 may comprise application-specific capabilities associated with a user baseline, user preferences, and sequence modification storage and access. The WUM system 244 may comprise computational and reporting capabilities typically associated with data aggregation including reporting of water and energy usage. The WUM system 244 may also include capabilities to propose alternate sequences that reduce levels of water and energy consumption. FIG. 4 shows an example of a typical account initialization sequence, which may include device installation, power and checkout; user account registration; device pairing with the user account; and user account management.

The flow chart of FIG. 5 illustrates programmed shower operation based on Program 1 of Table 1, comprising an exemplary sequence of seven shower steps (i.e., N=7). The example shower sequence is implemented from a look-up table illustrated in Table 2. Each step in the sequence (n=1 to 7) has a selectable time duration td, indicated in Table 1. The total (cumulative) lapsed time at the end of each step is indicated as tn, indicated in Table 2.

TABLE 2

| n | tn | Tsp (° C.) | Fsp |
|---|---|---|---|
| 1 | 1:00 | 41 | 100 |
| 2 | 3:00 | 27 | 100 |
| 3 | 4:00 | 27 | 50 |
| 4 | 6:00 | 41 | 50 |
| 5 | 8:00 | 41 | 100 |
| 6 | 9:00 | 49 | 150 |
| N = 7 | 10:00 | 27 | 100 |

Figure 5B:
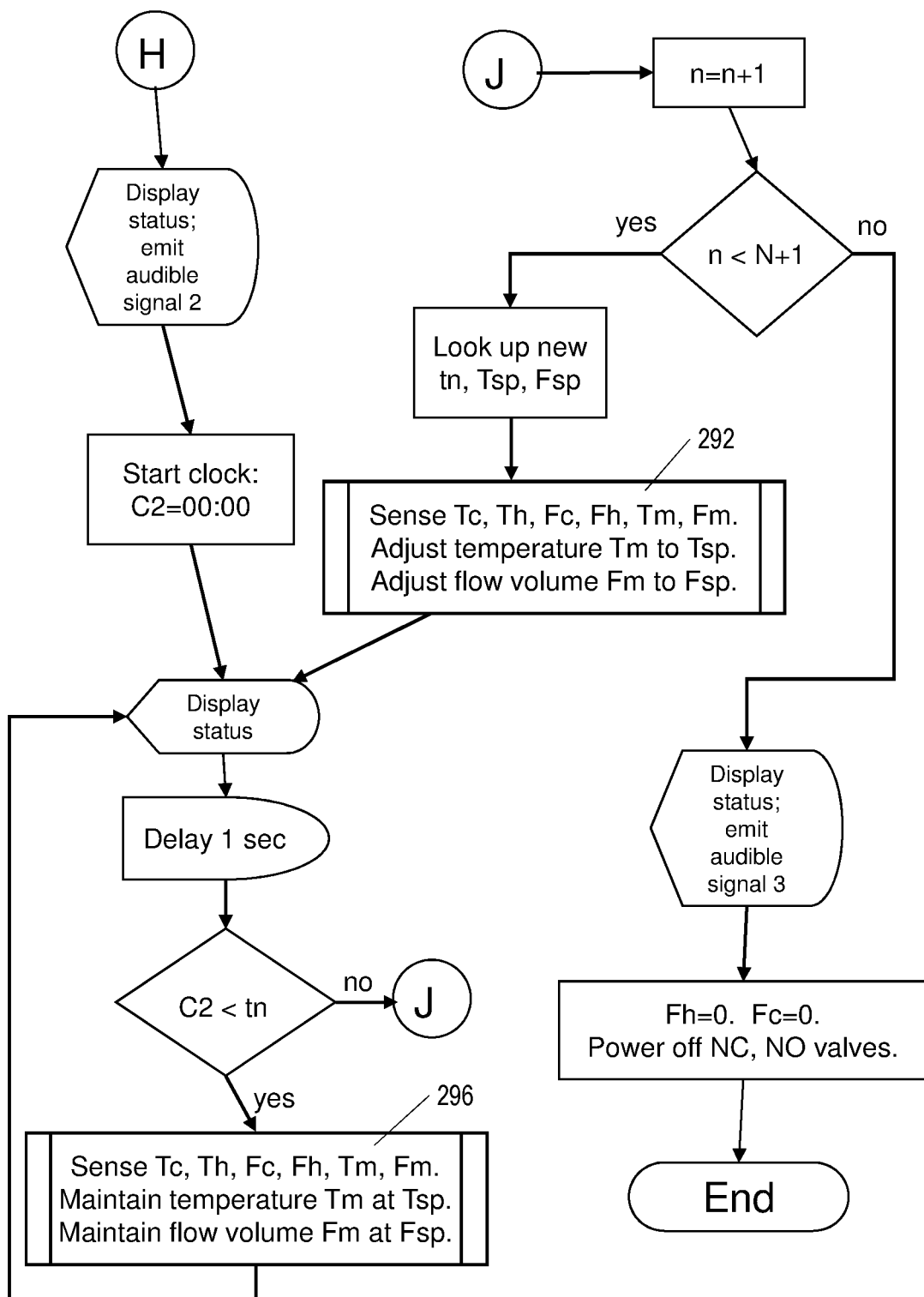
Figure 8:
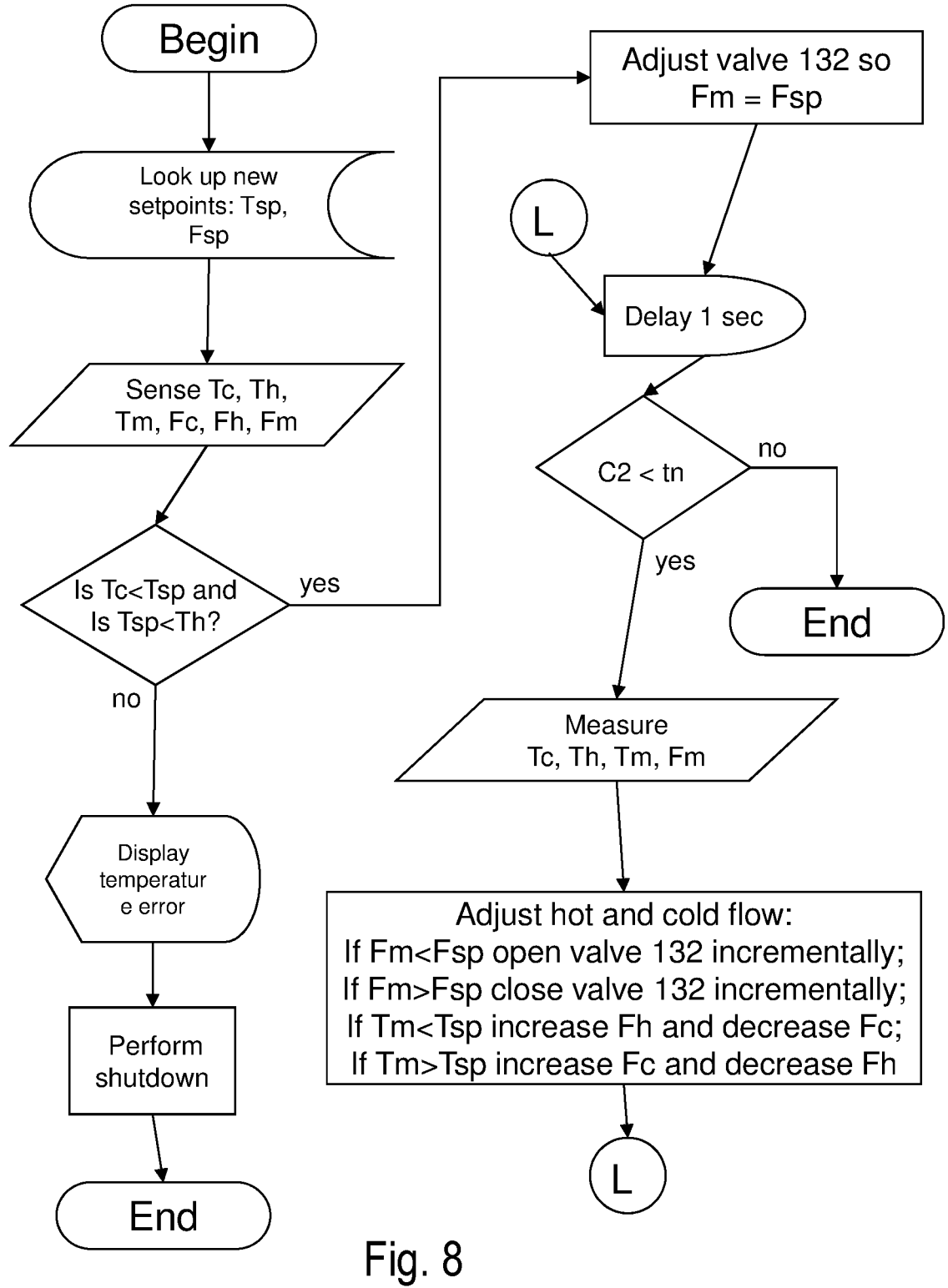
FIG. 8 illustrates, in flowchart format, a process for controlling temperature and flow rate, of water.
Figure 9:
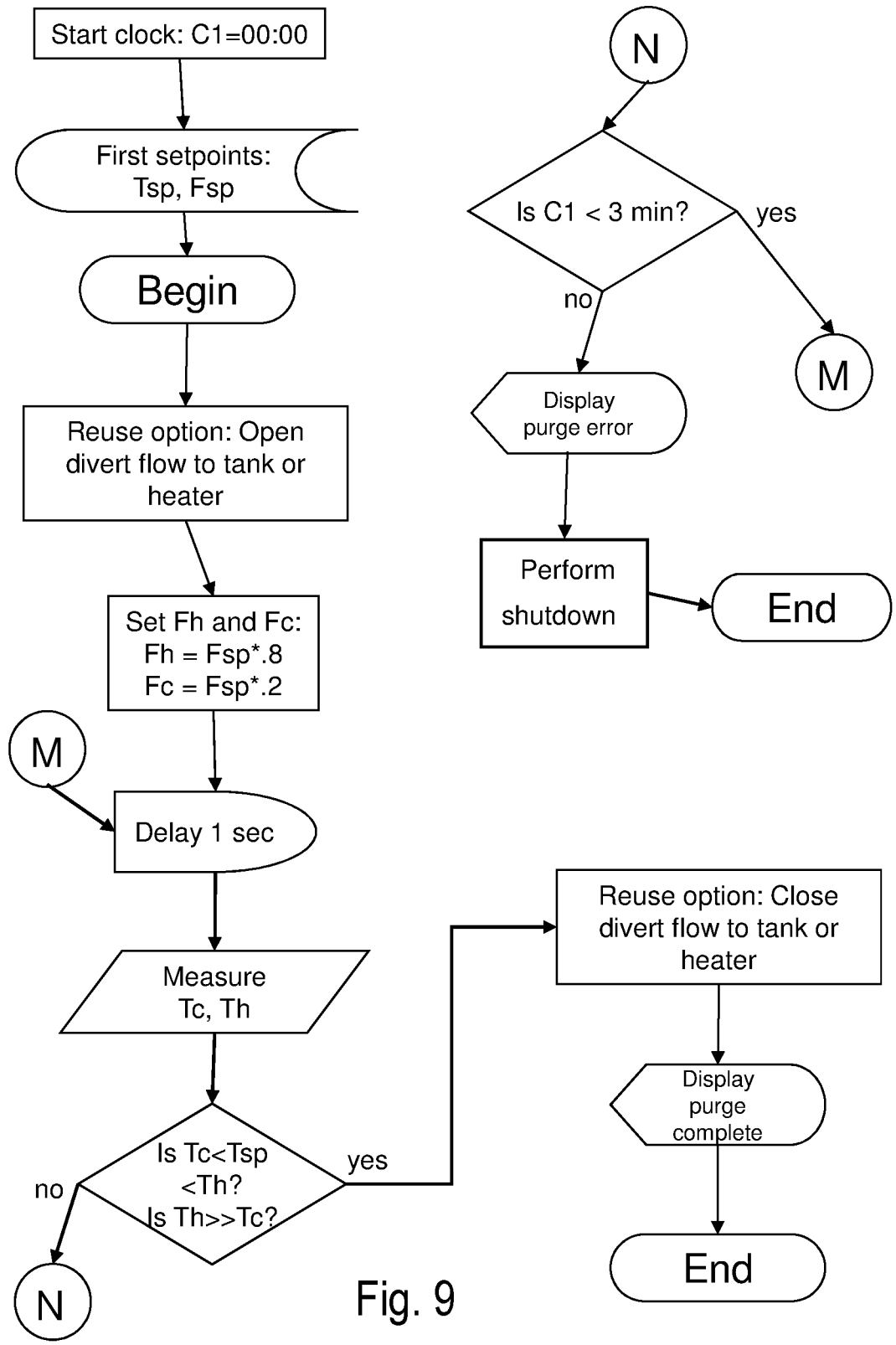
FIG. 9 illustrates, in flowchart format, a purge and reuse procedure.

Initially the user engages the user interface 16. The controller 32 responds by displaying choices of shower sequences 20, and the user selects or modifies a sequence 20, then initiates the shower sequence 20 (e.g. Table 1 Program 1). The controller 32 creates a look-up table (e.g. Table 2) from shower sequence 20, and initiates system parameters from the look-up table (e.g. N=7, n=1, tn=1:00, Tsp=41° C., Fsp=100). A timer function in the controller 32 is initiated to C1=00:00, and the controller 32 powers on the NC and NO valves to programmed positions. The NO valves 168, 176 are activated to prevent water flow to the manual mixing valve 64, and the NC valves 124, 128 are activated to permit water flow into the 4-way fitting 76. Controller 32 initiates a purge or reuse procedure 288 for cooled hot water 216 based on installation-specific purge/reuse settings. An example purge/reuse procedure 288 for the embodiments of FIGS. 2A, 2B, and 2C is illustrated in FIG. 9. The timer function, is used in the purge/reuse procedure to monitor the time and water used for purge/reuse. Controller 32 monitors sensors: hot water temperature sensor 184, cold water temperature sensor 192, and mixed water temperature sensor 200; valve settings: hot water in-line normally open (NO) powered valve 124 and cold water in-line normally open (NO) powered valve 128; and mixed water flowmeter 136 for measured values Th, Tc, Tm, Fh, Fc, and Fm, respectively. The controller executes a control loop procedure 292 that controls actuators and which, in this example, are valves 124, 128, and 132, that adjust the measured Tm to the initial set point Tsp, and to adjust the measured Fm to the initial set point Fsp. An example control loop procedure 292 is illustrated in FIG. 8. Controller 32 displays system status and initiates a first audible signal to communicate to the user that the temperature and flow rate are at the set points. A timer function in the controller 32 counts a delay period which, in this example, is 10 seconds, for the user to enter the shower. Referring also to FIG. 5B, controller 32 displays system status and a second audible signal, to communicate to the user that the beginning of the shower sequence 20 has been initiated. Controller 32 starts another timer function C2=00:00 corresponding to the values of tn in Table 2. Controller 32 again displays a system status, and counts a delay (e.g. 1 second). Controller 32 compares the value C2 of the timer function to tn (e.g. 1:00), and if C2 is less than tn, then controller 32 executes the control loop 296 to maintain Tm at Tsp, and Fm at Fsp, and once again displays a system status. If, after another 1 second delay, C2 is no longer less than tn, the step in the sequence 20 is complete and the controller increments the sequence step counter n (e.g., n=2), and compares n (e.g., n=2) to the number of steps N (e.g., N=7) in the sequence 20. If n is less than N+1, the controller 32 reads new system parameters from the look-up table (e.g. tn=3:00, Tsp=27° C., Fsp=100), and executes control loop procedure 292 to sense measured values and operate actuators to adjust Tm and Fm to the new set points Tsp and Fsp, respectively. In this regard, the term "adjust" denotes bringing Tm and Fm to new set points Tsp and Fsp, respectively, while the term "maintain" denotes keeping Tm and Fm at current set points Tsp and Fsp respectively. Controller 32 counts a time delay, checks clock C2, senses measured parameters, and maintains Tm and Fm at Tsp and Fm, respectively, throughout each step in the sequence. Controller 32 continues execution of steps in the sequence until the incremented value in the sequence step counter n is no longer less than N+1, in which case controller 32 displays a current system status and a third audible signal, to communicate to the user the end of the shower sequence 20. Controller 32 next sends signals to gradually power down valves 124, 128, and then sends signals to power down valves 116, 120, 168, 176. This returns the TC system 12 to a powered-down, inactive state, enabling the manual valve 64 to control water flow to the shower head 56. The foregoing description is exemplary of delay times, lookup table values, and use of audible signals.

Figure 6:
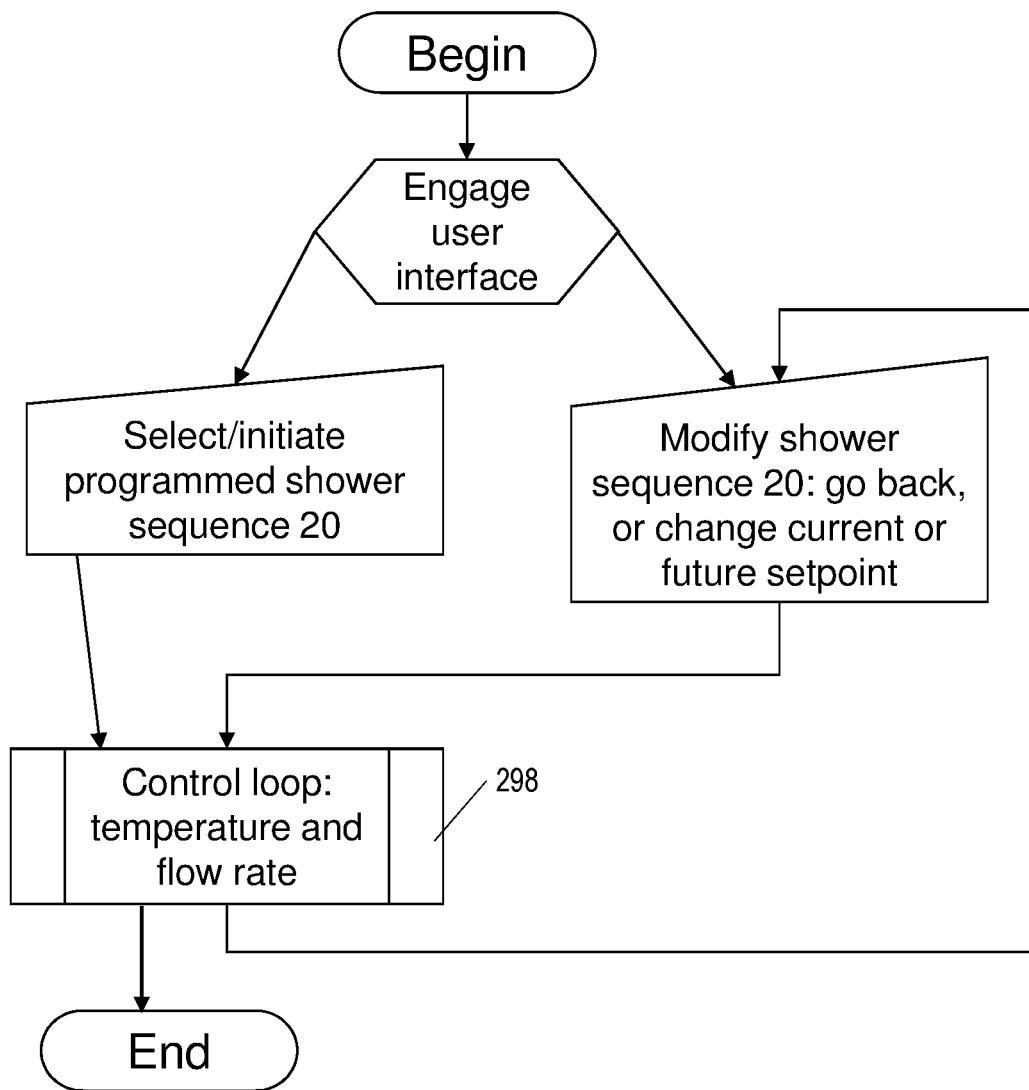
FIG. 6 illustrates a programmed shower sequence, in flowchart format, according to another embodiment.

FIG. 6 illustrates an exemplary subprogram by which a user may modify the programmed shower operation sequence 20 of FIG. 5 and Table 1. Water temperature control functions effected with a user interface 16 may include an in-situ manual override of the programmed sequence 20 to modify shower sequence, go back, or change current or future setpoints. A learning capability may be employed, in which case the program learns individual preferences of a user and adjusts the program sequence 20 for future use. FIG. 6 illustrates implementing the user modifications in the control loop procedure 298, which procedure may modify look-up table values including step time tn, before continuing similarly to control loop procedures 292, 296 as included in FIG. 5.

Figure 7:
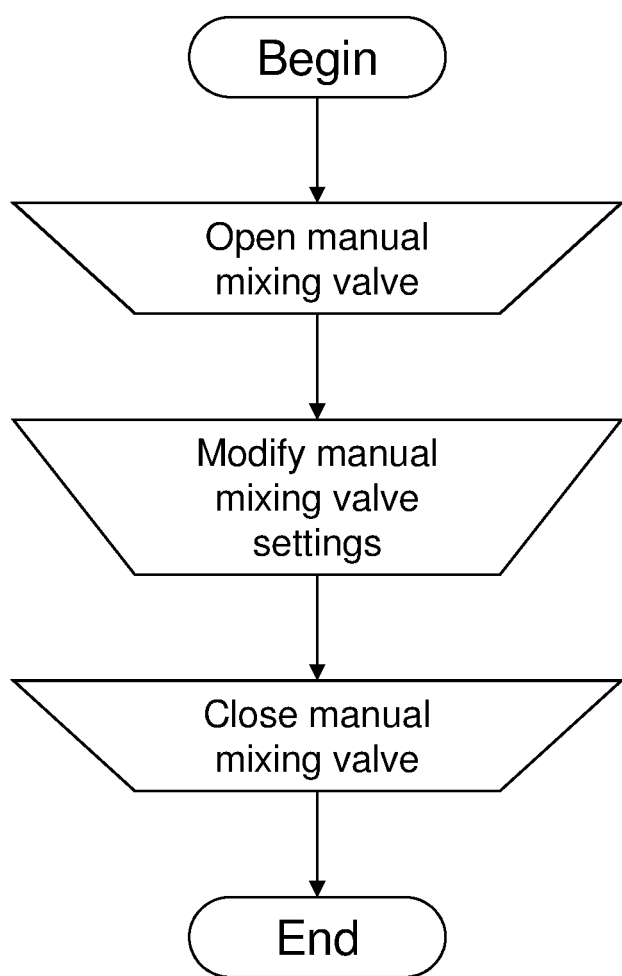
FIG. 7 illustrates a manual shower operation in flowchart format.

FIG. 7 summarily illustrates the manual shower operation sequence. When the TC system installed, and the TC system is unpowered, the system 12 is in a manual operation mode by default, where NO valves 116, 120, 124, 128 are fully open to allow water to flow to the manual mixing valve 64, and NC valves 116, 120 are fully closed to block any water flow which would otherwise bypass the manual mixing valve 64. The default manual operation mode enables the shower to operate manually in the event of a power failure. To operate the shower manually, the user opens the manual mixing valve 64, modifies the manual mixing valve 64 settings as desired, and after use closes the manual mixing valve 64.

The flow chart of FIG. 8 illustrates an exemplary procedure for the control loops 292, 296, 298 which effect mixed-temperature water temperature Tm and mixed water flow rate Fm. Controller 32 reads current parameters (e.g. N=7, n=5, tn=8:00, Tsp=41° C., Fsp=100) from a look-up table (e.g. Table 2) for one of the shower sequences 20 (e.g. Table 1). Controller 32 monitors values of hot water temperature sensor 184, cold water temperature sensor 192, mixed water temperature sensor 200 and mixed water flowmeter 136: Th, Tc, Tm, and Fm. In order to reach mixed-temperature water temperature set point Tsp by mixing hot water at temperature Th with cold water at temperature Tc, Tsp needs to be higher than Tc and lower than Th. If this is not the case, controller 32 sends a temperature error display and, in this example, performs a shutdown of the system 12. If Tsp is between Tc and Th, then controller 32 commands powered flow control valve 132 to increase or decrease flow of mixed-temperature water 44 until Fm is at the setpoint flow rate, Fsp (e.g., Fm reaches Fsp=100). Controller 32 may incrementally open or close valves 124, 128 to increase or decrease Fh and Fc respectively, to provide fine control of Fm and Tm. Controller 32 counts a delay which, in this example, is for 1 second. Controller 32 compares the timer function value C2 to tn (e.g., 8:00), and if C2 is not less than tn, the step has been completed and the controller returns to the process illustrated in FIG. 5. If C2 is less than tn, then controller 32 monitors Tc, Th, Tm, and Fm. If Fm is less than or greater than Fsp, controller 32 sends a signal to open or close valve 132 incrementally. If Tm is less than Tsp, controller 32 incrementally opens valve 124 and incrementally closes valve 128. If Tm is greater than Tsp, controller 32 sends a signal to close valve 124 incrementally and open valve 128 incrementally. Controller 32 then repeats the delay, determines whether the timer value C2 is less than tn, and continues to perform measurement and adjustment steps until tn is not less than C2, at which time the sequence step has been completed and the controller returns to the process illustrated in FIG. 5.

Water flow from the cold water supply 52 and the hot water supply 48 are mixed by the TC System 12 and adjusted to provide an output as the mixed temperature water 44 conforming to the setpoint temperature and flow rate values. Thereafter, the mixed-temperature water 44 temperature Tm is continually monitored during each timed step in the sequence 20 and maintained as described above. To avoid "ringing", i.e., repeatedly overshooting the setpoints, the choice of incremental changes to valve 124, 128, 132 positions may be optimized to limit the ringing, e.g. using a multiplicative dampening factor in the control loop algorithm. In FIG. 8, specific details, including delay times, error checking, and dampening factors are illustrative and not limiting in the scope of the present invention.

The flowchart of FIG. 9 illustrates a procedure 288 for purge and reuse of water. Before the procedure begins, controller 32 starts a timer function C1 and reads initial set points, including mixed-temperature water temperature set point Tsp and mixed-temperature water flow rate set point Fsp. According to installation settings regarding purge or reuse options, controller 32 may select one of three options to: (i) direct a purge operation to allow cooled-down water 216 in the hot water supply line 144 to flow through the shower head 56 to the shower drain (not shown); (ii) direct operation of tankless or flash heater 224 to heat cooled-down water 216 as shown in FIG. 2A; or (iii) initiate a reuse operation which diverts cooled-down water 216 to holding tank 228 as shown in FIG. 2B or water heater 232 as shown in FIG. 2C. Selection of option (iii) may depend on available capacity in the holding tank 228 or water heater 232, in which case the controller may initiate option (i). Whichever option is employed, according to the exemplary algorithm of FIG. 9, controller 32 opens valve 124 to 80% so Fh is 80, and opens valve 128 to 20% so Fc is 20. The exemplary algorithm of FIG. 9 limits the purge/reuse operation to 3 no more than minutes, after which time, if the system does not indicate that all cooled water has been purged from the hot water line, the controller displays a purge error message and the system is shut down. This avoids continued running of water when, for example, the water heater is not outputting water at a minimum required temperature. In 1 second increments, controller 32 monitors Th, Tc and compares them to Tsp. Initially, with cooled water in the hot water line, Th will not be greater than Tsp. After cooled-down water 216 is purged or diverted to the holding tank 228 or water heater 232 long enough for Th to become greater than Tsp, controller 32 initiates closure of powered hot water control and diverter valve 260, displays a message that the purge operation is complete, and resumes performing the process steps of FIG. 5. The foregoing description is exemplary of delay times, error checking, and initial settings.

The described illustrations are merely descriptive of principles of the invention and are not limiting with respect to embodiments. In another embodiment of the TC system, water flow from a sink is programmed for brushing teeth in three steps: providing the water flow to wet the brush, turning off the water flow, and turning the water flow back on for rinsing. At completion of the three steps, the water flow is turned off. Each of the three steps is programmed for a set time duration, and is programmed for a set water flow rate. This embodiment may require a different configuration of sensors and valves and different programmed steps. The concepts which have been disclosed are also applicable to a tub fill, or a recirculating tub or spa or Jacuzzi. Those embodiments may require control and reheating of recirculating water. These and other embodiments may employ an enunciator function for auditory communication of advancing steps in a shower sequence.

Embodiments of the present invention directed to still other applications will be apparent to those skilled in the art. Numerous variations, changes and substitutions may also be made without departing from the invention. Accordingly, it is intended that the invention be limited only by the spirit and scope of the claims which follow.

The claimed invention is:

1. A showering system comprising a controller for use with a shower head for receiving water according to first or second configurations,
   the first configuration providing a first operating mode which enables manual control for mixing hot and cold water for flow to the shower head when the controller is not powered; and
   the second configuration providing a user selectable second operating mode for a user to run a sequence of programmed system settings to flow water through the shower head during a first showering step at a first temperature for a first time period, and then change the temperature of water flowing through the shower head for flow during a second showering step during a second time period wherein, in the second operating mode, the controller automatically blends hot and cold water during showering steps to send water through the shower head at a predefined temperature specified by the user.

2. The showering system of claim 1 further including:
   a feed line providing hot water;
   a feed line providing cold water;
   first and second branch lines each coupled to the feed lines to send hot and cold water through the shower head;
   at least one manual control valve positioned in the first branch line to control flow of water through the shower head when the system is operated in the first mode;
   first and second normally open valves positioned in the first branch line and configured by the controller to prevent flow of water through the first branch line to the shower head when the system is operated in the second mode; and
   a plurality of additional automated valves, including first and second normally closed valves positioned in a second branch line, for controlling flow of water through the second branch line to the shower head, the plurality of additional automated valves configured to automatically control mixing of hot and cold water when the system is operating in the second mode.

3. The showering system of claim 2 wherein the controller responds to user selection of temperature for mixing of hot and cold water by adjusting one or more in the plurality of additional automated valves.

4. The showering system of claim 1 wherein the system operates in the first configuration as a default condition and operates in the second configuration only when a user selects operation in the second mode.

5. The showering system of claim 1 wherein the controller is a microcomputer which, in the second configuration, runs a program to automatically provide the user a selectable timed sequence of automated showering steps, the system further including a processor based handheld programmable device having a wireless communication link with the controller, the handheld programmable device including application software executable thereon by which the user may run, modify, or program controller settings and initiate the timed sequence of automated showering steps in the second mode of operation.

6. The showering system of claim 2 further including a powered flow control valve positioned to receive flow from the second branch line to control flow of water to the shower head when the system operates in the second mode, wherein the controller adjusts the powered flow control valve responsive to a user selectable flow of water through the shower head.

7. A computer-implemented method executable on a microprocessor for automatically controlling operation of a showering system in a user selectable program mode, the showering system method including executing a first series of program steps to provide a user selected timed sequence of automated showering steps by automatically blending a mixture of hot and cold water and sending the blended mixture through a water line to a shower head, wherein:
   one or more of the program steps is responsive to receipt of digital data into the microprocessor to initiate an automated programmed sequence of multiple timed showering steps for a showering activity, and applying a first stored value for desired water temperature during a showering step or time duration of a showering step for water flowing through the shower head during a first time period, and providing, to the microprocessor, sensor information indicative of temperatures in hot and cold feed lines to the shower head, and providing, to the microprocessor, sensor information indicative of temperatures of the blended mixture of hot water and cold water, and for at least the first and second steps in the sequence, generating signals that blend hot and cold water by adjusting one or more valve positions to adjust the temperature for the blended mixture of hot and cold water flowing through the shower head, the computer-implemented method configured for execution on a microcomputer comprising the microprocessor, the method further including communication between the microcomputer and a handheld programmable device, the handheld programmable device including application software executable thereon by which a second series of program steps provides digital data comprising (i) the selected timed sequence of showering steps or (ii) desired temperature for water flowing through the shower head.

8. The computer-implemented method of claim 7 wherein the step of applying a stored value for water temperature during a showering step or time duration of a showering step for water flowing through the shower head at the desired temperature for a predetermined time, further includes operating the microprocessor system to then change the temperature of water flowing through the shower head by adjusting the one or more valve positions to provide water through the shower head at a user specified temperature for said another step.

9. The computer-implemented method of claim 7 wherein, prior to sending signals that blend hot and cold water, purging water in the hot water feed line when water temperature in the hot water feed line is below a threshold value.

10. The computer-implemented method of claim 7 wherein blending hot and cold water to attain the desired temperature includes a feedback control operation based on temperature measurement of water flowing to the shower head.

11. The computer-implemented method of claim 7 wherein communication between the microcomputer and the handheld programmable device includes a wireless communication link and occurs over an internet, an intranet, or a cellular network.

12. The computer-implemented method of claim 7 executable on a microcomputer comprising the microprocessor, wherein:
valve settings are selected to effect flow of water from the hot and cold feed lines through either of first and second branch lines to send hot and cold water through the shower head, the first branch line providing manual control for mixing hot and cold water for showering while operating the system without power, and
the second branch comprises one or more valves, under control of the microcomputer for adjusting a valve position, to attain the desired temperature for water flowing through the shower head.

13. In a showering system comprising a manual valve assembly for manually controlling flow and mixing of hot and cold water for flow through a shower head, and a controller for automatic control of water flow through the shower head, a method for controlling operation of the showering system according to a user preference, the method comprising:
providing a valve configuration in the showering system which, when power is not provided to enable operation of the controller, enables operation of the manual valve assembly to manually control flow and mixing of hot and cold water for flow through the shower head;
providing power to operate the showering system, including enabling operation of the controller;
changing the valve configuration in the showering system so that, when the controller is enabled for operation, functional operation of the manual valve assembly, that would otherwise control flow and mixing of hot and cold water, is disabled;
selecting a sequence of timed steps for a showering activity for which multiple steps in the sequence have specified a desired temperature of water flowing through a shower head;
providing to a control system electrical signals indicative of temperatures in hot and cold feed lines connected to the shower head;
providing to the control system electrical signals indicative of measured temperature of blended water flowing through the shower head;
for at least one step in the selected sequence, operating the control system to send signals that blend hot and cold water from the feed lines by adjusting one or more valves to attain a selected temperature for blended water flowing through the shower head in response to the selected temperature; and
flowing water through the shower head during the first step for a predetermined time and then changing the temperature of water flowing through the shower head in response to a second selected temperature specified for a second step in the sequence by further adjusting the one or more valves to provide water through the shower head.

14. The method of claim 13 further including removing cooled water from a portion of the hot feed line by purging the cooled water through a drain, or reheating the cooled water, or redirecting the cooled water for reuse, prior to initiating one of the timed steps.

15. The method of claim 13 wherein the one or more valves are adjusted using feedback control to attain the temperature specified for water flowing through the shower head for the at least one step.

16. The method of claim 13 further including operating the control system to send signals that adjust the flow rate of water passing through the shower head in accord with a value specified for the at least one step.

17. The method of claim 16 wherein the control system receives measured flow rate data from a water line and uses feedback control to adjust the flow rate of water passing through the shower head.

18. A user controlled monitoring and control system for operating a shower in a plumbing system having a series of sensors providing temperature and flow rate information for hot water provided by a hot water feed line and for cold water provided by a cold water feed line of the plumbing system, which hot water and cold water provide temperature blended water to feed a shower head, the series of sensors including a first temperature sensor providing a temperature measurement for the blended water being fed to the shower head, the system further including a plurality of remotely controllable valves positioned to adjust mixing of the hot and cold water, or flow rate of the temperature blended water, delivered from the hot and cold water feed lines, the monitoring and control system comprising:
a processor,
storage containing program instructions representing software executable on the processor, the instructions including a plurality of shower programs, each shower program comprising a sequence of showering steps with each showering step characterized by a specified time duration, a specified temperature, and a specified volume flow rate for water egressing from the shower head, volatile memory to which the processor can issue program instructions and write data acquired from the sensors, and a user interface for selecting program options and displaying system information, the system connectable through a network to monitor temperature and flow rate information provided by one or more of the sensors and to receive user selection of a programmed shower sequence from a provided library of sequences where, for multiple ones of the showering steps in a sequence, the system is responsive to user specified selections of (i) time duration of the step, and (ii) flow rate or temperature of water output from the shower head, wherein:

the system automatically progresses through the steps of the user selected shower program sequence by:

sending control signals to adjust setting of one or more of the valves based on specifications in each shower step, and blending hot and cold water to attain the desired temperature at the shower head based on a feedback control operation using the temperature measurement of water flowing to the shower head with the first temperature sensor providing the temperature measurement for the blended water being fed to the shower head.

19. An automated water dispensing system for a user to control flow or temperature of water being output by a plumbing system including a bath or shower, the automated water dispensing system associated with the bath or shower comprising:

a processing system coupled to receive sensed values of water flow or water temperature for operation of the automated water dispensing system in accord with specifications selected by the user, the processing system including a processor connected to actuators including valves and said processor sending control signals to effect required actuator or valve setting adjustments to comply with a user selected temperature specification or a user selected flow rate specification for water output by the plumbing system wherein at least one setting is adjusted with a feedback control operation complying with a user selected specification;

a plurality of sensors positioned to sense water temperature or flow rate in one or more water feed lines, such as a hot water feed line or a cold water feed line to the bath or shower, or to sense temperature in a temperature adjustable water line coupled to receive a controllable mixture of water from the hot and cold water feed lines, each sensor coupled to the processing system to provide temperature or flow information to the processing system; and a plurality of control lines, extending from the processor to the plumbing system, and coupled to control operation of one or more components in the plumbing system, wherein the processing system is configured to modify mixing of water from the hot or cold water feed lines and thereby adjust temperature of water in the temperature adjustable water line based in part on sensed temperature of the mixture of hot and cold water, wherein the automated water dispensing system is programmed to automatically step through a sequence of showering steps, each step having a predetermined duration and water temperature.

20. In an internet network interfacing a community of users, a water usage monitoring system for a plurality of water usage control systems that provide programmable water flow sequences in plumbing systems, the monitoring system programmed to:

enable user account registration over the internet network;

associate a user control device with a user account to select a programmed water flow sequence of flow steps, from a provided library of sequences, to flow water during a first step at a first temperature for a first time period, and then change the temperature of water flowing during a second step during a second time period wherein a controller automatically blends hot and cold water during the flow steps to send water at a predefined temperature specified by the user;

associate a water usage control system with a user account, to direct temperature or flow rate control signals to the water usage control system;

enable software updates; and provide a user interface to select program options or display system information, the monitoring system comprising:

a library of programmed water flow sequences;

a processor; and a non-transitory computer readable medium containing program instructions representing software executable on the processor, which instructions, when executed by the processor, cause the system to perform method steps, comprising:

storing and organizing user preferences and modifications to the programmable sequences;

storing, organizing, aggregating, and reporting water and energy usage data;

transferring data;

performing analyses to determine energy consumption and water consumption;

gathering baseline data; and providing alternate water flow sequences that reduce water and energy consumption for implementation by the water usage control systems.

* * * * *